United States Patent [19]
Seyferth et al.

[11] Patent Number: 6,020,447
[45] Date of Patent: Feb. 1, 2000

[54] SONICHEMICAL SYNTHESIS OF SILICON CARBIDE PRECURSORS AND METHODS FOR PREPARATION THEREOF

[75] Inventors: Dietmar Seyferth, Lexington, Mass.; Toshiya Sugimoto, Osaka, Japan; Pawel Czubarow, Menlo Park, Calif.

[73] Assignee: Massachusetts Institute of Technology, Cambridge, Mass.

[21] Appl. No.: 08/828,958

[22] Filed: Mar. 28, 1997

Related U.S. Application Data

[60] Provisional application No. 60/014,475, Mar. 29, 1996.

[51] Int. Cl.[7] .................................................. C08G 77/04
[52] U.S. Cl. .............................. 528/10; 528/14; 556/430; 522/148
[58] Field of Search .............................. 556/430; 528/10, 528/14; 522/148

[56] References Cited

U.S. PATENT DOCUMENTS

| | | | |
|---|---|---|---|
| 4,276,424 | 6/1981 | Peterson, Jr. et al. | 556/430 |
| 4,472,591 | 9/1984 | Schilling, Jr. et al. | 556/430 |
| 4,537,942 | 8/1985 | Brown-Wensley et al. | 528/12 |
| 4,611,035 | 9/1986 | Brown-Wensley et al. | 525/474 |
| 4,704,444 | 11/1987 | Brown-Wensley et al. | 528/15 |
| 4,808,685 | 2/1989 | Bortolin | 528/14 |
| 4,921,321 | 5/1990 | Weidman | 350/96.12 |
| 5,091,485 | 2/1992 | Noireaux et al. | 525/478 |
| 5,204,380 | 4/1993 | Seyferth et al. | 522/148 |
| 5,439,780 | 8/1995 | Joshi et al. | 430/296 |

*Primary Examiner*—Margaret G. Moore
*Attorney, Agent, or Firm*—Wolf, Greenfield & Sacks, P.C.

[57] ABSTRACT

A process is provided that involves reductive coupling of polysilane precursors to form polysilane in the presence of ultrasonification. The resulting precursors, upon pyrolysis, lead to improved SiC ceramic product. Ultrasonification can be used to produce oligosilanes from precursors thereof, or polysilanes from monomers, dimers, trimers, or oligomers. Precursors can include Si:C in a ratio of about 1:1, and the invention allows formation of SiC having a Si:C ratio of about 1:1.

8 Claims, 10 Drawing Sheets

SONICHEMICAL SYNTHESIS OF SILICON CARBIDE PRECURSORS AND METHODS FOR PREPARATION THEREOF

This application claims the benefit of U.S. Provisional No. 60/014,475, filed Mar. 29, 1996.

BACKGROUND OF THE INVENTION

1. Field of the Invention

The present invention relates generally to sonichemical methods of making carbide precursors and methods of making these precursors, and more specifically to such precursors that comprise polysilanes as well as methods of making these polysilanes.

2. Discussion of the Related Art

Silicon carbide (SiC) is a ceramic material that has a variety of uses. For example, SiC can be used as a high temperature resistant material, such as in boiler furnaces and steam reforming operations. In addition, SiC can be used as an abrasive material for cutting or grinding metals. In preparing SiC, polysilanes are often used as precursors, with the pyrolysis of these polysilanes resulting in the desired SiC material. It is generally believed that branching and cross-linking of a polysilane or polycarbosilane precursor is necessary to afford high ceramic residue yields of SiC when the polymer is pyrolyzed. There are various ways of achieving high molecular weight branched and/or cross-linked polysilanes and hence high ceramic yields.

One approach to preparing such polysilanes includes the reductive coupling of $RSiCl_3$ compounds by potassium/sodium (Na/K) alloys to yield soluble polymer networks, $(RSi)_n$. This technique is disclosed in *J. Am. Chem. Soc.* 110, 2342 (1988) and U.S. Pat. No. 4,808,685.

The use of alkali metals for the combined reductive-dehydrogenative coupling of silanes is also disclosed in *Am. Ceram. Soc. Bull.* 62, 912 (1983); *Polymer Preprints* 25, 1 (1984); and U.S. Pat. No. 4,472,591. According to this method, $MeHSiCl_2$ and vinyl chlorosilanes are reacted with K or Na to produce polysilanes (eqs. 1 and 2).

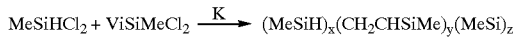

(1)

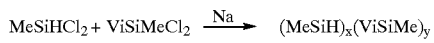

(2)

As disclosed in U.S. Pat. Nos. 4,537,942, 4,611,035 and 5,091,485; PCT International Patent Application WO 93/14,164; T. G. Wood Ph.D. Thesis, Massachusetts Institute of Technology, Chapter 4 (1984); and Chem. Abstr. 120:198710u (1993), partly crosslinked polymethylsilane has been prepared by the reaction of $MeSiHCl_2$ and Na in THF (eq. 3).

(3)

An alternate approach to polysilane synthesis involves the coupling of oligomethylsilane. For example, J. L. Robison, Ph.D. Thesis, Massachusetts Institute of Technology, Chapter 2 (1992), *J. Am. Ceram. Soc.* 75, 1300 (1992) and U.S. Pat. No. 5,204,380 disclose the reaction of oligomethylsilane with a catalytic amount of an early transition metallocene derivative. These metallocene derivatives induce a dehydrogenative coupling reaction which yields branching and crosslinking and consequently affords a polymer whose pyrolysis gives a high ceramic yield of near-stoichiometric SiC. In addition, the use of $LiAlH_4$ as a cross-linking catalyst for oligomethylsilane to produce a high molecular weight polymethylsilane has been disclosed in *Inorganic and Organometallic Oligomers and Polymers*, Proceeding of the 33rd IUPAC Symposium on Macromolecules, p. 23 J. F. Harrod and R. M. Laine, R. M., Eds.; Montreal, Canada (1991); and *Appl. Organomet. Chem.* 8, 95 (1994).

Cyclic oligosilanes have been synthesized by reacting chlorohydrosilanes with lithium or lithium-alkali metal alloys, as disclosed in U.S. Pat. No. 4,276,424. In this reaction Si—Si bonds are formed by the removal of halogen and hydrogen from the chlorohydro silane by action of alkali metals (eq. 4).

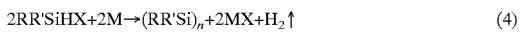

(4)

In at least some prior art arrangements processing conditions or products are not ideal where transition metal catalysts are used, residual transition metal can exist in the ultimate product, which can be disadvantageous in some circumstances. In some processes, polysilane product is not as highly branched as would be optimal to result in high ceramic yield. It remains a challenge in the art to prepare SiC precursors using relatively inexpensive, readily available and safe materials such that the polysilanes can produce comparatively pure SiC in high yield. In particular, it would be advantageous to synthesize such precursors comprising polysilanes that have these desirable characteristics.

SUMMARY OF THE INVENTION

The present invention provides techniques for efficient, clean, and relatively safe synthesis of oligo or polysilanes and conversion of polysilanes to SiC. One aspect of the invention provides a method involving combining a reducing agent and a polysilane precursor to form a mixture and exposing the mixture to ultrasonic radiation. A polysilane can be produced according to the method from a precursor that is a monomer or oligomer. In one embodiment the step of exposing the mixture to ultrasonic radiation involves exposing a monomer to ultrasonic radiation to produce an oligomer. The polysilane can be pyrolyzed to form SiC.

In another embodiment the invention involves forming silicon carbide by pyrolyzing a polysilane synthesized by reductive coupling of a polysilane precursor with a reducing agent in the presence of ultrasonic radiation. In another embodiment the invention involves pyrolyzing a polysilane formed via the reductive coupling of a polysilane precursor in the presence of sodium to produce silicon carbide having less than about 0.5 weight percent sodium.

The invention also provides a method involving reacting a reducing agent and a polysilane precursor to produce a polysilane having a formula $[(CH_3SiH)_x(CH_3Si)_y(CH_3SiH_2)_z]_n$, wherein a sum of x and z is at most about 0.4%.

Also provided in accordance with the invention is a method that involves heating a polysilane to about 300° C. to form a first species, and maintaining a temperature of the first species at about 300° C. for about 2 hours to form a second species. The method then involves heating the second species to a temperature of at least about 1000° C. to form silicon carbide that is substantially free of elemental silicon.

The invention also provides a method that involves reducing a polysilane precursor including a halide with a metal selected from the group consisting of alkaline metals, alkaline earth metals in combinations thereof to form a polysilane encapsulated in a crystal of a salt of the metal and the halide.

According to another aspect the invention provides a series of articles. In one embodiment a silicon carbide is provided that is formed from pyrolysis of a polysilane produced via reductive coupling of a precursor in the presence of ultrasonic radiation. In another embodiment a polysilane is produced that derives from reductive coupling of a polysilane precursor in the presence of ultrasonic radiation.

The invention also provides silicon carbide produced by pyrolysis of polysilane formed by reductive coupling via sodium, the silicon carbide having less than about 0.5% sodium by weight.

BRIEF DESCRIPTION OF THE DRAWINGS

Other advantages, novel features, and objects of the invention will become apparent from the following detailed description of the invention when considered in conjunction with the accompanying drawings, in which.

DETAILED DESCRIPTION

Figure 1:
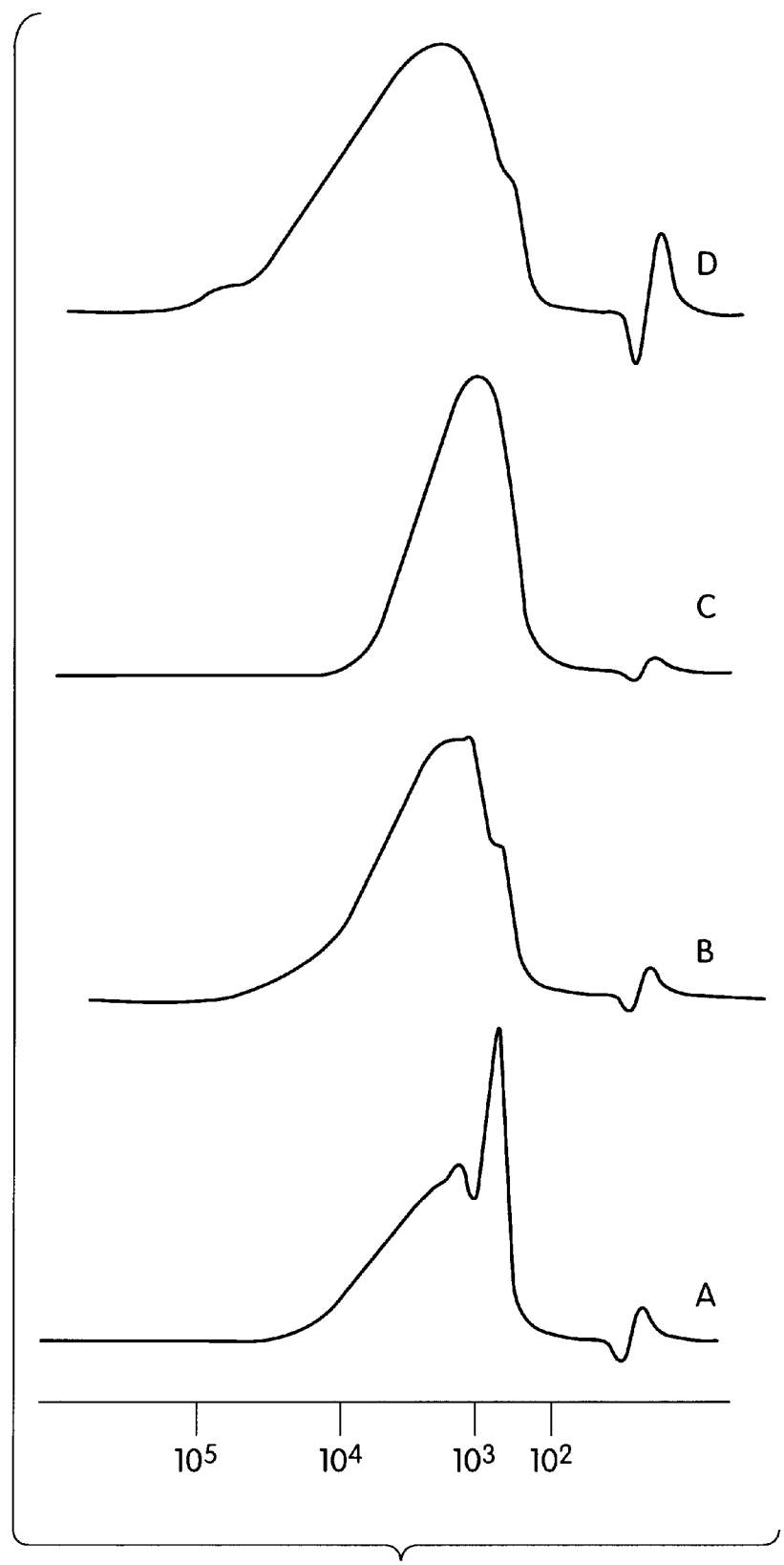
FIG. 1 shows GPC spectra of polymethylsilanes according to the present invention.

The present invention involves the use of ultrasonication to enhance reductive coupling polysilane precursors such as silane compounds and/or oligosilane compounds. The invention involves SiC precursors, methods of making these precursors, and SiC resulting from these precursors. In particular, the present invention relates to these concepts as they relate to SiC precursors comprising polysilanes.

In one embodiment, polysilanes are formed by the reaction of a silane compound reactant or reactants with a reducing agent in the presence of ultrasonic radiation. The silane compound and the reducing agent are disposed within a solvent system and exposed to ultrasound radiation under conditions appropriate to produce polymethylsilanes and/or silane oligomer oils. The resulting polymethylsilanes can be isolated and subsequently pyrolyzed to produce SiC.

The silane compounds used in producing the polymethylsilanes of the present invention can be any silane compounds that are capable of undergoing a reductive coupling reaction with a reducing agent to result in the formation of a polysilane. Such silane compounds include, but are not limited to, those of the formula $R_1R_2SiX_2$, where $R_1$ and $R_2$ can be the same or different and can be H or a hydrocarbon such as an akyl, aryl, alkaryl, aralkyl, alkenyl, either linear, branched, or cyclic and from about 1 to about 18 carbon atoms, and X denotes a halogen atom, preferably Cl. Preferably, at least one $R_1$ or $R_2$ is H. A second reactant can be one of the formula $RSiX_3$ wherein R is as described above for $R_1$ and $R_2$ and $X_3$ is a halogen, preferably Cl. Examples of R, $R_1$ and $R_2$ are H, methyl, ethyl, isobutyl, phenyl, tolyl, and phenylethyl. These compounds are well known and are described, for example, in U.S. Pat. No. 4,808,685, incorporated herein by reference. Alternatively, $R_1$ or $R_2$ can be a vinyl radical, this arrangement being described in U.S. Pat. No. 5,091,485, incorporated herein by reference. In preferred embodiments, the silane compound or compounds used in the reaction to form polysilanes have an overall ratio of carbon atoms to silicon atoms of about 1:1. Because of the techniques of the invention, the polysilanes that result from the synthesis have a ratio of carbon atoms to silicon atoms which is about 1:1. Those or ordinary skill in the art can select suitable reactants to achieve a C:Si ratio of about 1:1.

The silane compound also, in preferred embodiments, is selected such that there is minimal steric hindrance to rupturing Si—H bond(s).

Toward these ends, in preferred embodiments the silane reactant is $CH_3HSiCl_2$. Suitable reactants for forming the polysilane are described also in U.S. Pat. Nos. 4,808,685, 5,204,380, 4,472,591, 4,276,424, and 4,537,942, each incorporated herein by reference.

In another embodiment, polymethylsilanes of the present invention may be prepared by the reaction of a reducing agent with an oligosilane compound in the presence of ultrasonic radiation. The oligosilane compound and the reducing agent are disposed within a solvent system and exposed to the ultrasound radiation. Oligosilane compounds can be, for example, dimers or trimers of the above-described polysilane precursors, preferably those having a ratio of Si:C of about 1:1, such as $H_3CSi(Cl)_2Si(Cl)_2CH_3$, and the like. Most preferably the oligosilane compound is methyloligosilane.

Reducing agents appropriate for use in the present invention are limited only in that they should be capable of reacting with a silane compound to produce a polymethylsilane. Such reducing agents include, for example, alkali and alkaline earth materials and their alloys. Preferably, the reducing agent is selected from Na, K, Li and alloys of these with each other (e.g., NaK) or with other compounds (such as NaPb). Most preferably the reducing agent is Na. It is to be noted that the use of Na offers the advantage of being about twenty times less expensive than K while also being less reactive with air, moisture or other oxidizing species.

The source of ultrasound radiation used should provide sufficient ultrasound radiation to induce the reaction of the reducing agent and silane compound, resulting in the formation of a polymethylsilane. In one embodiment, the source produces about 350 Watts of ultrasonic radiation at a frequency of from about 45 kHz to about 56 kHz. The power and frequency values can be adjusted by those of ordinary skill in the art routinely which in some cases can affect the rate of reaction.

Solvent systems appropriate for use in the present invention should be capable of dissolving the polysilane precursor, and preferably capable of simultaneously dissolving the polysilane precursor and the polysilane product.

Such solvent systems can be a single solvent or a combination of solvents. An exemplary list of solvents includes hydrocarbon solvents such as toluene, THF, ethers, nitrogen-containing solvents such as ethylenediamine, triethylamine, and N,N,N',N'-tetramethylethylenediamine. The solvent system, in one embodiment is not a solvent for the alkali metal halide formed during the reaction and these can be easily removed by filtration. Preferably, the solvent system is selected from hexane/THF and toluene/THF. It has been found that using a solvent system that includes an aromatic hydrocarbon, such as toluene, can result in a higher molecular weight polymethylsilane, and therefore higher ceramic residue yields, than when a nonaromatic hydrocarbon is used. When the polysilane precursor includes an oligosilane, the solvent system should include an ether.

The polysilane, preferably polymethylsilane, should be pyrolyzed under conditions that optimize the yield of ceramic residue. Typically, pyrolysis of the polymethylsilane occurs in an inert environment, such as afforded by the use of argon (Ar). The temperature during pyrolysis is preferably at least about 800° C., more preferably at least about 900° C. and most preferably at least about 1000° C.

Ultrasonification typically takes place at from about room temperature to about 80° C. Ultrasonification can take place at room temperature, avoiding complicated prior art reaction parameters including harsh conditions such as reflux which typically results in less control over the molecular weight of the polysilane product. Ultrasonification, in accordance with the invention, results in better control over product formation under mild macroscopic reaction conditions. For example, the tendency to create polymers that are not soluble in a particular solvent system is reduced using ultrasonification. The temperature of the solvent system during ultrasonification is not critical since ultrasonification itself creates tiny regions of very high temperature. During ultrasonification, implosive collapse of bubbles can produce intense localized heating and high pressure for very short periods of time. This localized activity can reach temperatures of up to 5000° C. and pressure of 500 atm., with heating and cooling rates of $10^9$ K/s. In preferred embodiments, ultrasonification in connection with formation of a polysilane from a precursor that is a monomer should be performed for at least about 22 hours. However, ultrasonification beyond about 60 hours can result in a polymeric species that may not be soluble in the solvent system. Therefore, ultrasonification is preferably performed for from about 40 hours to about 60 hours. Extending the time of ultrasonification can result in higher molecular weight polymethylsilanes.

It is to be noted that higher pyrolysis temperatures or extended pyrolysis times can reduce the amount of residual reducing agent in the resulting SiC. It is advantageous to reduce the level of impurities in the resulting SiC. According to preferred embodiments of the present invention, the SiC has less than about 0.1% by weight reducing agent, more preferably less than about 0.05% by weight reducing agent and most preferably from about 0.5 to about 0.05% by weight reducing agent. As noted above, in some prior art arrangements a transition metal is used in connection with polymerization of a polysilane precursor. These transition metals typically do not volatilize during pyrolysis, therefore use of those agents can be disadvantageous. The present invention, according to embodiments in which an alkali or alkaline earth metal is used, avoids residual transition metal impurity in the SiC product.

To produce high molecular weight polymethylsilanes from monomeric precursors, an excess of reducing agent should be used. Preferably, the molar ratio of reducing agent to silane compound is at least about 2:1, more preferably at least about 2.5:1, more preferably at least about 3:1 and most preferably at least about 3.5:1. Where an oligosilane is used as a precursor, the molar ratio of reducing agent to oligosilane can be lower, for example about 0.5:1. Using an oligosilane as a polysilane precursor can in many cases be a faster and more efficient technique.

The yield of ceramic residue is defined, for purposes of the present invention, as the molecular weight of the ceramic residue following pyrolysis divided by the molecular weight of the polysilane precursor times 100%. According to this definition the highest theoretical yield is about 91%. In the prior art maximum yield according to this definition typically approached only 55%. In accordance with the present invention, the percent yield is at least about 60%, preferably at least about 70%, more preferably at least about 80%, more preferably still at least about 87%.

As noted above, it is believed that increasing the level of cross-linking and/or branching of the polysilane increases the yield of ceramic product when the polysilane is pyrolyzed. Thus, the polysilanes of the present invention preferably have a formula $[(CH_3SiH)_x(CH_3Si)_y(CH_3SiH_2)_z]_n$ where x+y+z=1 and (x+z) is (x+z) is less than about 0.41, more preferably less than about 0.35, more preferably still less than about 0.30. In one set of embodiments x+z is from about 0.33 to about 0.41. For example, ultrasonification for from about 40 hours to about 60 hours can result in a polysilane having (x+z) equal to about 0.36 with a ceramic residue yield of about 73% after pyrolysis.

In one aspect of the invention, ultrasonification is used in reactions involving production of oligosilanes from their precursors which have a lower molecular weight than the oligomers. In this set of embodiments, ultrasonification is carried out for a shorter period of time, for example about 5 hours.

One aspect of the present invention is better formation of SiC pellets via pyrolysis. In most prior art techniques, a polysilane is formed into a pellet via known techniques and, upon pyrolysis at for example 1000° C., the pellet is dimensionally unstable, falling apart, forming powder, and/or bubbling or spattering. Using the polysilanes of the present invention formed via ultrasonification, pellets can be formed that, when pyrolyzed, undergo relatively uniform shrinkage thus producing a pellet that is integral and dimensionally stable that does not disintegrate, bubble, or spatter.

In another, related advantage, the polysilanes of the present invention can be spun into fibers that can be pyrolyzed to make SiC fibers without addition of a curing agent, formation of a protective oxide layer on the fibers, or the like prior to pyrolysis to avoid morphological degradation (Brady, et al., Eds. *Materials Handbook McGraw Hill, Inc.*, 1991, page 742; Harrod, et al., *Inorganic and Organometallic Oligomers and Polymers*; Proceeding of the 33rd IUPAC Symposium on Macromolecules; Montreal, Canada, 1991, page 23). In the present invention, polysilanes formed via ultrasonification can be spun into fibers and pyrolyzed directly, without curing agent or protective oxide layer, into SiC fibers.

Another advantage of the present invention is that very pure SiC results from pyrolysis of the polysilanes formed via ultrasonification. Prior art techniques typically result in 15–20%, by weight based on the weight of the ceramic, elemental silicon in the SiC product. In accordance with the present invention, SiC is produced having less than about 10% residual Si, more preferably less than about 7%, more preferably less than about 5%, and more preferably still about 3% or less.

Another advantage of the invention is that polysilanes are formed, via ultrasonification, that are essentially free of polysiloxanes. In typical prior art procedures, polysiloxane impurity exists in polysilanes produced. The polysilanes produced in accordance with the invention include less than about 0.3% by weight polysiloxanes, more preferably less than about 1.5% by weight polysiloxanes.

In connection with the aspect of the invention involving formation of an oligosilane from an oligosilane precursor using ultrasonification, in one embodiment $CH_3SiHCl_2$ is reduced with Na in the presence of ultrasonification and yields a clear oil with a structure of $[(CH_3SiH)_x(CH_3Si)_y(CH_3SiH_2)_z]_n$ where x/z=4; x+y+z=1; and $0.94 \geq x+z \geq 0.75$, depending on the reaction conditions. The variable z denotes the mole fraction of end groups of the oligomer, x indicates the mole fraction of difunctional main chain units and y represents the mole fraction of trifunctional branched units. The second stage product of the reductive coupling of $CH_3SiHCl_2$ by Na yields a high molecular weight poly (methylsilane).

It is a further advantage of the present invention to provide a method of making high molecular weight polysilanes in a single pot synthesis procedure. In particular, the reaction of the polysilane precursor and a reducing agent in the presence of ultrasonification can be performed in a single pot to produce polysilanes having molecular weight of about 100,000. Many conventional polysilane processes cannot be performed using a single pot procedure. Furthermore, known polysilane processes used in a single pot procedure typically produce polysilanes having a molecular weight on the order of 10,000.

Another advantage of the invention is that polysilanes are produced that are moisture-stable. Many prior art techniques result in moisture-sensitive polysilanes. The polysilanes of the invention are stable at room temperature at greater than 70% humidity for extended periods of time.

Figure 4:
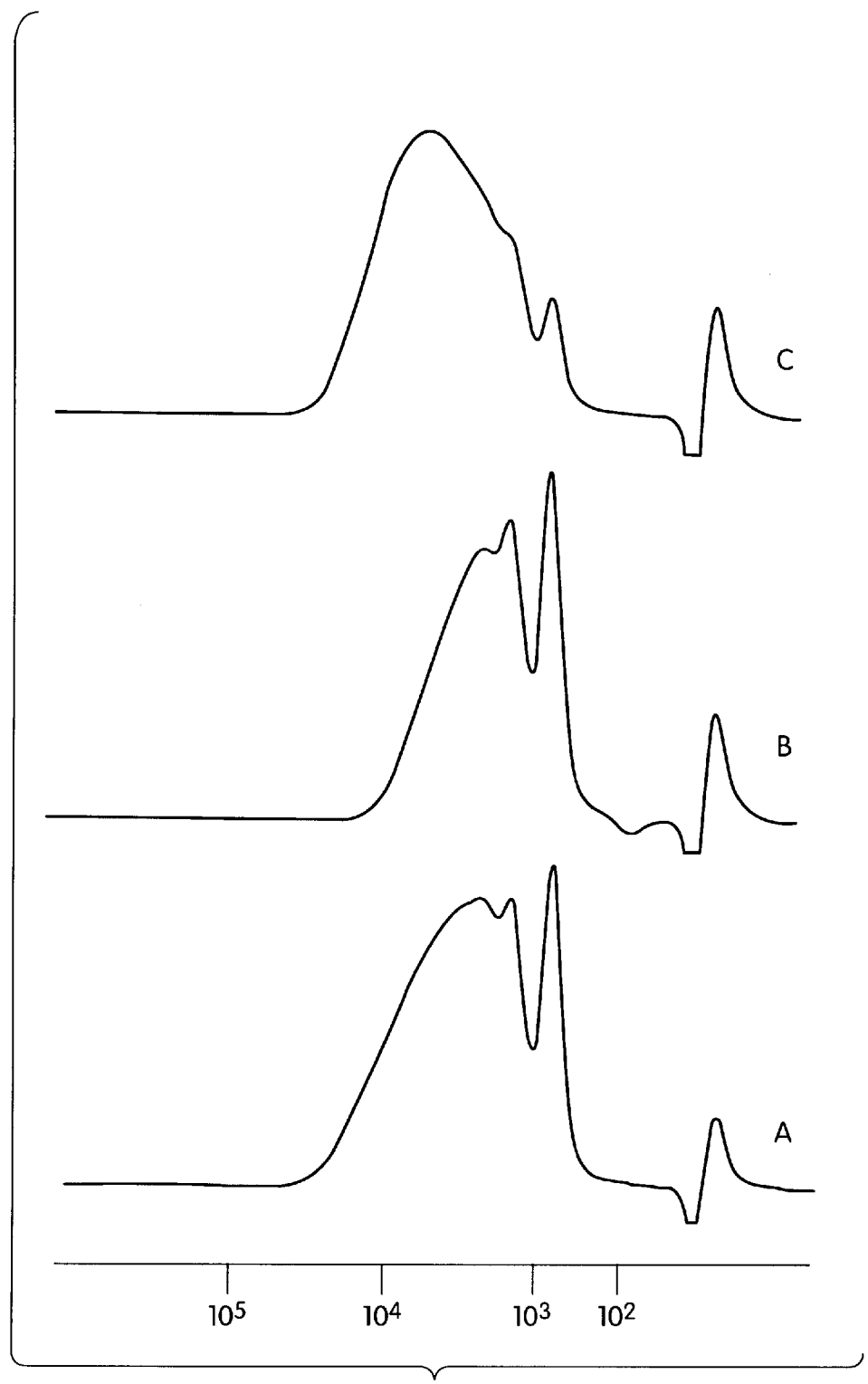
FIG. 4 shows GPC spectra of polymethylsilanes according to the present invention.

FIG. 4a shows the result of formation of a polysilane from an oligosilane, in particular formation of polymethylsilane from oligomethylsilane. The resulting polysilane has a trimodal molecular weight distribution. About 80% by weight of the overall polysilane was soluble in hexane. FIG. 4b shows that the low molecular weight fraction can be extracted with hexane. FIG. 4c shows that the high molecular weight fraction is soluble in toluene. The polysilane produced with an oligosilane appears to have a higher molecular weight than the polysilane produced using a silane compound.

Figure 2:
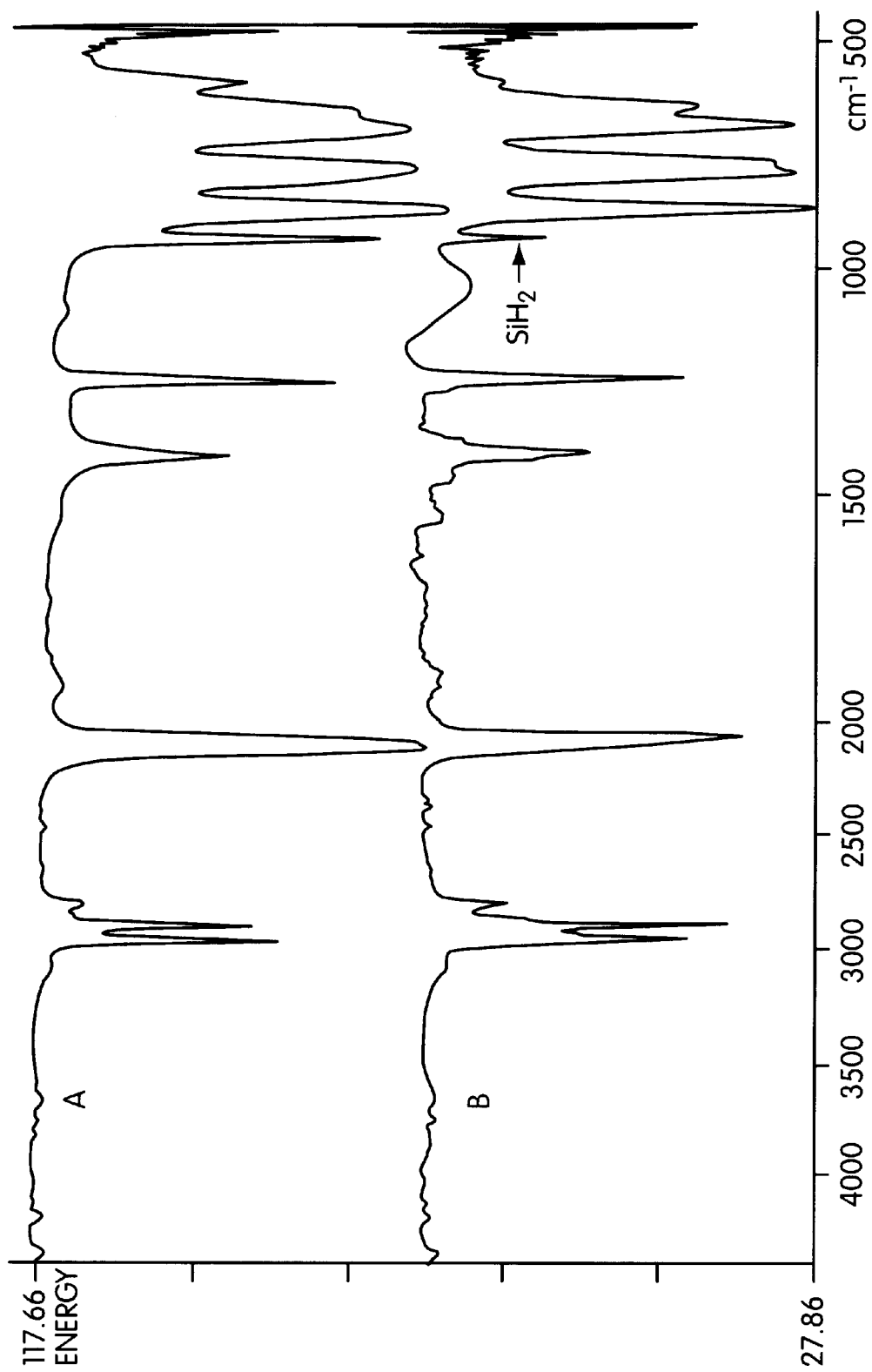
FIG. 2 shows FTIR spectra of one embodiment of polymethylsilane according to the present invention.

In one embodiment, the invention provides a method of synthesis of a high molecular weight poly(methylsilane) obtained from the $CH_3SiHCl_2$ and sodium reaction in 7/1 v/v hexane/THF or toluene/THF (PMS-2) using ultrasonication for more than 22 h (preferably 30–40 h) in 50–65% yield. This polymer (PMS-2) was isolated as highly pyrophoric, orange-yellow solid ((x+z)=0.33–0.41) which is soluble in toluene and partly soluble in hexane. It afforded the ceramic residue in 75 to 87% yield upon pyrolysis. The elemental analysis of PMS-2 indicated the presence of 0.64% residual Na. Pyrolysis of this polymer in Ar at 1000° C. afforded a ceramic containing 0.41% Na. After pyrolysis in argon at 1500° C. for 3 h only 0.14% Na remained. If the pyrolysis of this polymer was carried out for longer periods of time or at higher temperature, the amount of Na would diminish to ppm levels since NaH decomposes at 800° C. and elemental Na (b.p. 882.9° C.) probably would volatilize (Weast, R. C. Ed.n "Handbook of Chemistry and Physics", CRC Press (1988)). The products from both stages of the reductive coupling reaction (i.e., oligomer oil and solid poly(methylsilane) have almost identical "structure" based on their IR spectra (FIG. 2). However, the IR spectrum of the second stage product shows a diminished absorption due to $\gamma SiH_2$ at 930 cm$^{-1}$. The diminished content of $SiH_2$ was confirmed by DEPT$^{29}$Si NMR. Also, the pyrolysis product of the first and second stage showed almost identical XRD patterns.

Figure 3:
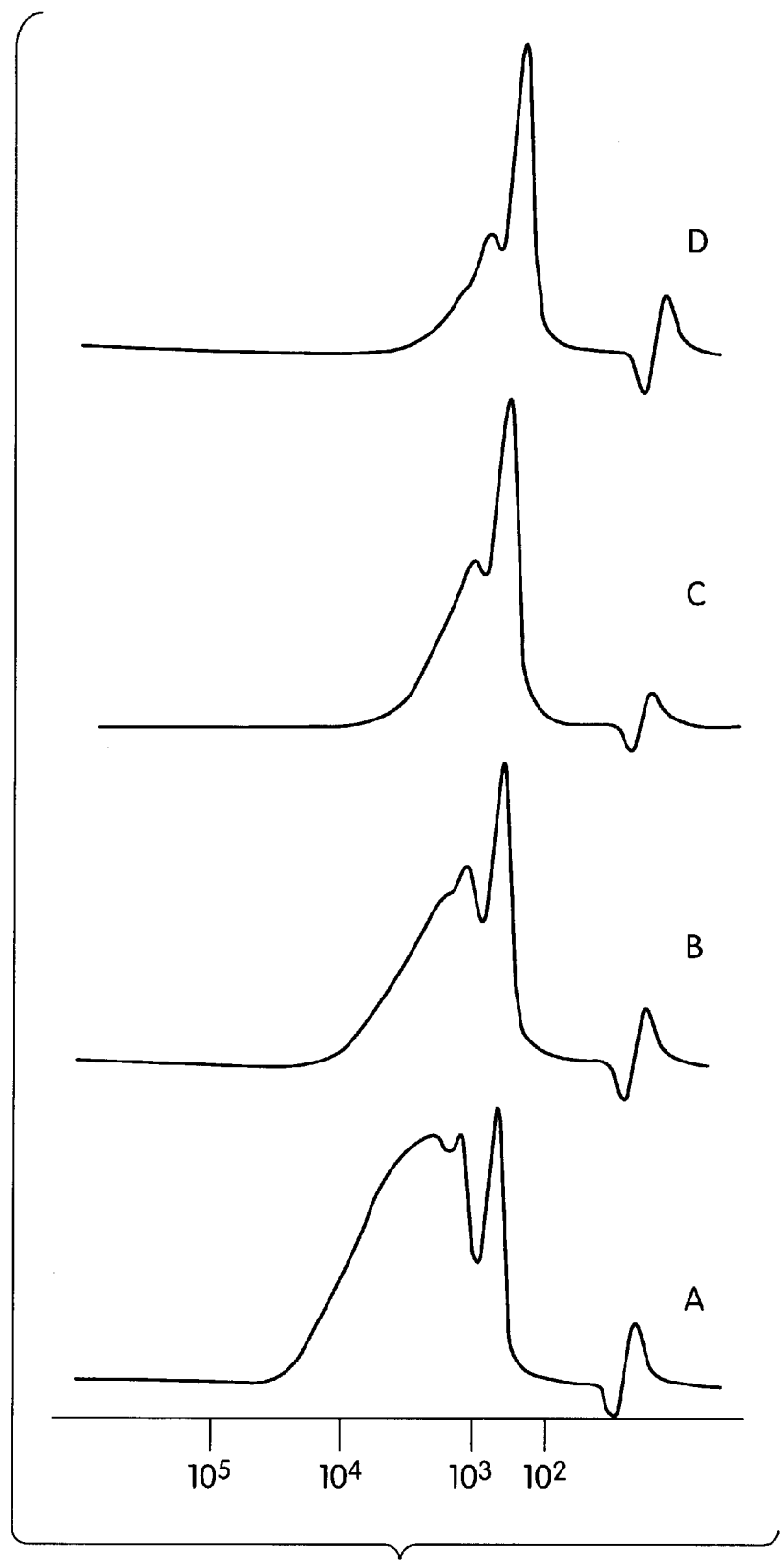
FIG. 3 shows GPC spectra of polymethylsilanes according to the present invention.

Different reaction conditions were also investigated. It was observed that the presence of aromatic hydrocarbons such as toluene affords higher molecular weight polymer (hence higher ceramic residue yields) than when hexane is used (FIG. 3). The highest yield of high molecular weight, soluble product is obtained when the duration of ultrasonication is 40 to 60 h. Above 60 h of ultrasonication some insoluble, crosslinked product is formed. Also, only insoluble product was formed when reflux of the reaction mixture was used instead of ultrasonication for the same period of time. An excess of Na ($\geq 2.5$ molar equivalents) is required to obtain the high molecular weight poly (methylsilane). Use of a stoichiometric amount of Na yields only an oil product that contains Si—Cl bonds, even after 40 h of ultrasonication.

The extended time reductive coupling reaction also affords large NaCl crystals which contain high molecular weight poly(methylsilane) ((x+z)=0.36) whose pyrolysis gives a ceramic residue yield of 73%.

The Wurtz reductive coupling of $CH_3SiHCl_2$ using sodium and ultrasonic activation (350 W, 45–56 kHz) in its first stage (10–20) hours of ultrasonication) afforded the usual 65–91% yield of clear oil oligo(methylsilane). In addition, a high molecular weight solid poly(methylsilane) (PMS-1), formed in about 10% yield, was found entrapped within the large, yellow NaCl crystals adhering to the unreacted sodium. According to the $^1$H NMR spectrum value of (x+z)=0.65. Pyrolysis of this polymer afforded a 77% yield of ceramic residue whose only crystalline phase is β-SiC according to XRD pattern. Based on the elemental analysis, the polymer still contains 0.14% sodium. By GPC, this polymer shows a trimodal molecular weight behavior with the highest molecular weight at about $10^5$ relative to polystyrene (FIG. 1).

Figure 5:
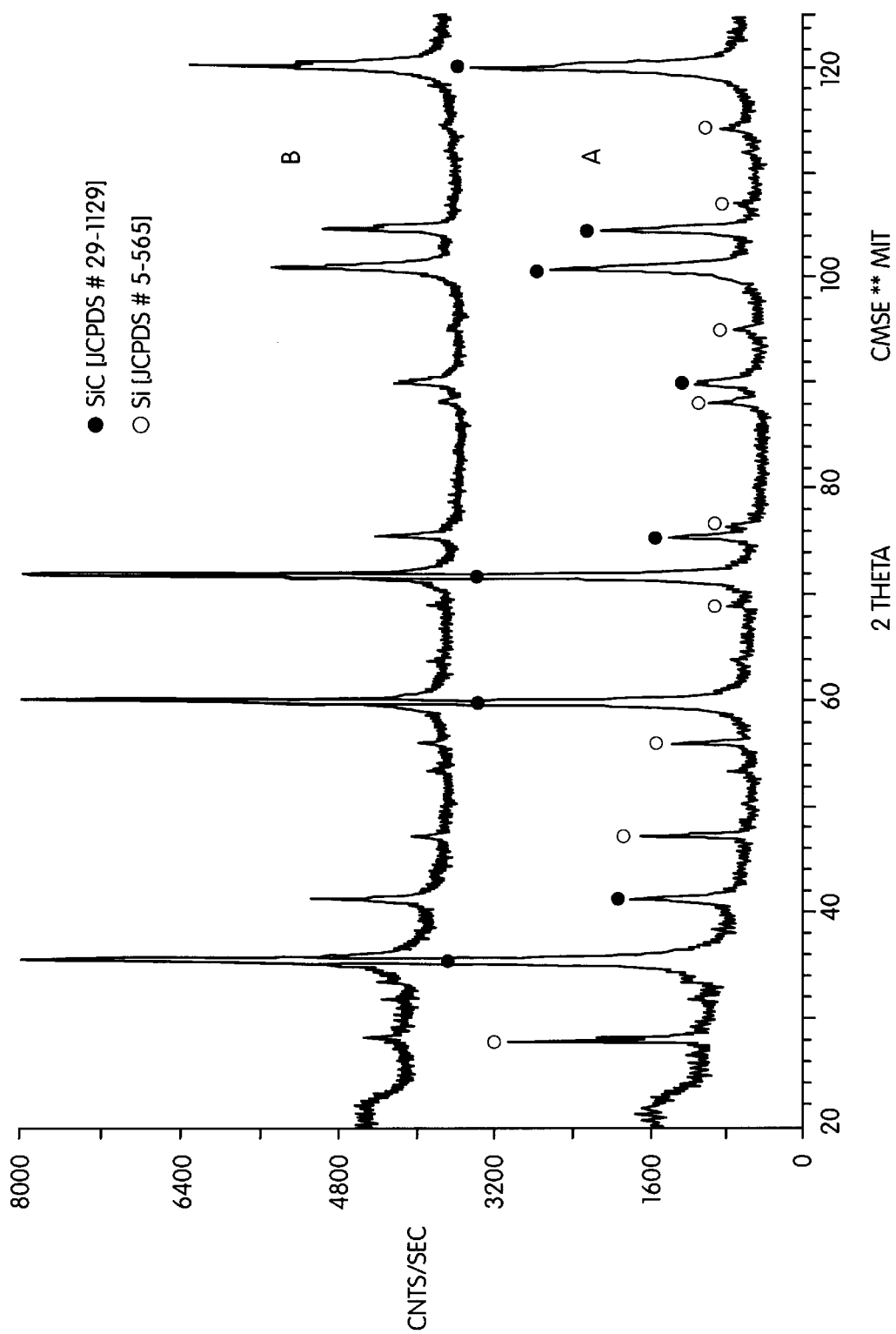
FIG. 5 shows XRD patterns of ceramic materials according to the present invention.

Another type of high molecular weight poly (methylsilane) is obtained by the action of Na with ultrasonication on previously synthesized oligo(methylsilane). In this reaction, 0.5 molar equivalent of Na and 1.0 molar equivalent of oligo(methylsilane) in 7/1 v/v toluene/THF were ultrasonicated for about 5 hours. This reaction does not take place in the absence of ethereal co-solvent. This reaction yields a toluene-soluble, pyrophoric, pumpkin-yellow-to-orange solid polymer (PMS-3) ((x+2)=0.36). Upon pyrolysis in Ar, this polymer affords near-stoichiometric SiC in about 87% yield. The GPC trace of this polymer depicts a trimodal molecular weight distribution with a broad, high molecular weight region (~10,000) and two narrow low molecular weight regions (~1,000 and ~500, respectively) (FIG. 4a). The low molecular weight end can be extracted with hexane (PMS-3H) as shown in the GPC trace (FIG. 4b) and the high molecular weight is soluble in toluene (PMS-3T) (FIG. 4c). About 80% of PMS-3 was soluble in hexane. The PMS-3 polysilane appears to have a higher molecular weight than PMS-2 polymer (FIG. 3). It also was observed that, in general, high molecular weight poly(methylsilane) gives higher purity β-SiC on pyrolysis (less elemental Si) compared to the lower molecular weight species, as shown by the XRD's (FIGS. 5). The elemental analysis of PMS-3 indicated the presence of 1.45% residual Na. The hexane-soluble fraction (PMS-3H), however, contained only 0.096% Na. Pyrolysis of PMS-3 in Ar at 1000° C. afforded a ceramic that contained 0.68% Na. After pyrolysis at 1500° C for 3 h only 0.055% Na remained. The orange color of the polymer is indicative of living silyl anion intermediate. To terminate —Si⁻Na⁺ isolated polymer was redissolved in toluene and enough MeI was added to change the color of the solution from yellow-orange to clear, hence quenching the living intermediate. After removal of insoluble material, the solvent was removed at reduced pressure, leaving a white solid polymer which, based on elemental analysis, contained 1.11% Na (before quenching the polymer contained 1.72% Na) and which upon pyrolysis in Ar afforded a ceramic residue in 74–79% yield. The molecular weights and their distributions of MeI quenched and of unquenched polysilanes are identical. The MeI quenched polymer also does not show any melting behavior.

Figure 6:
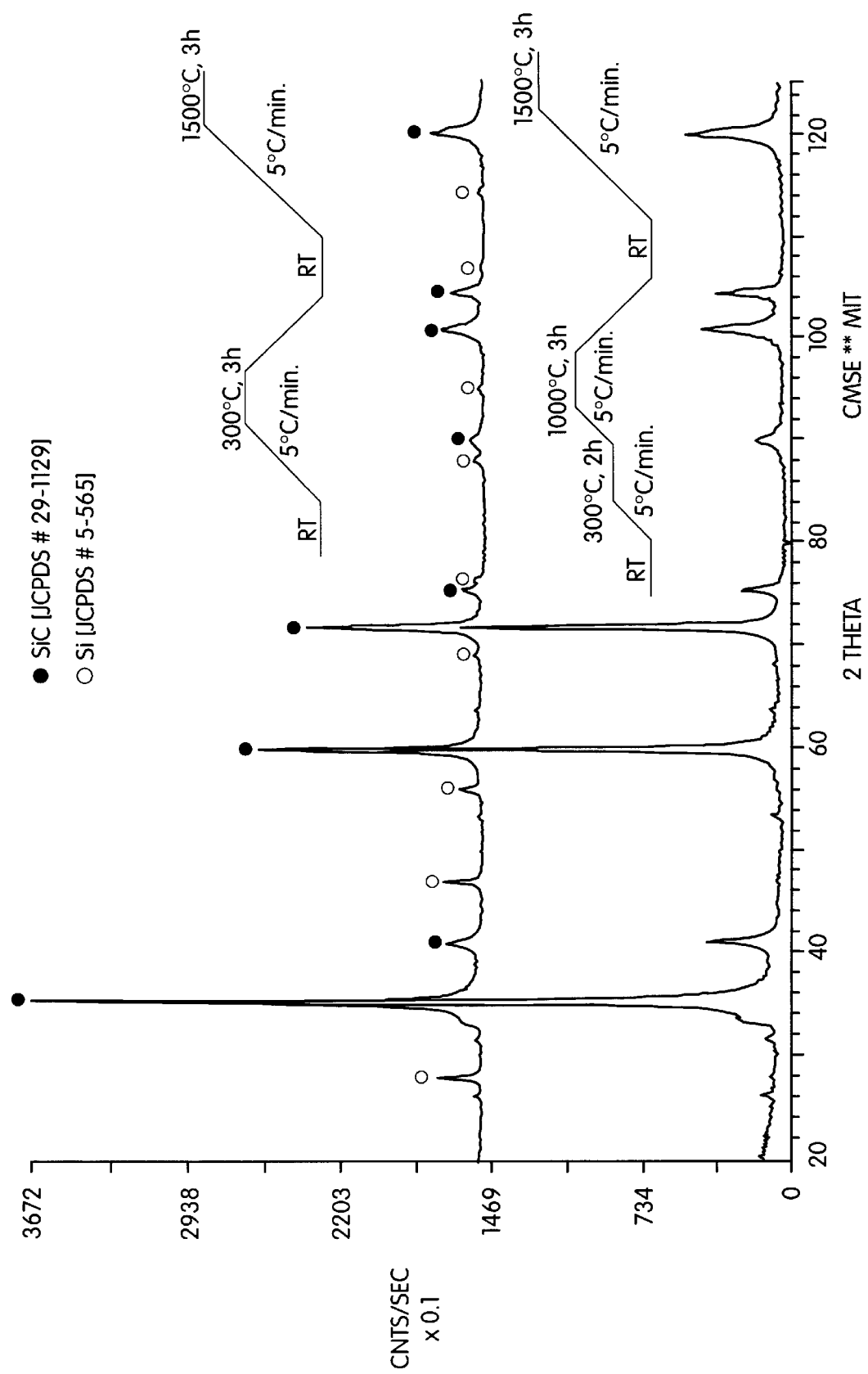
FIG. 6 shows XRD patterns of ceramic materials according to the present invention.
Figure 7:
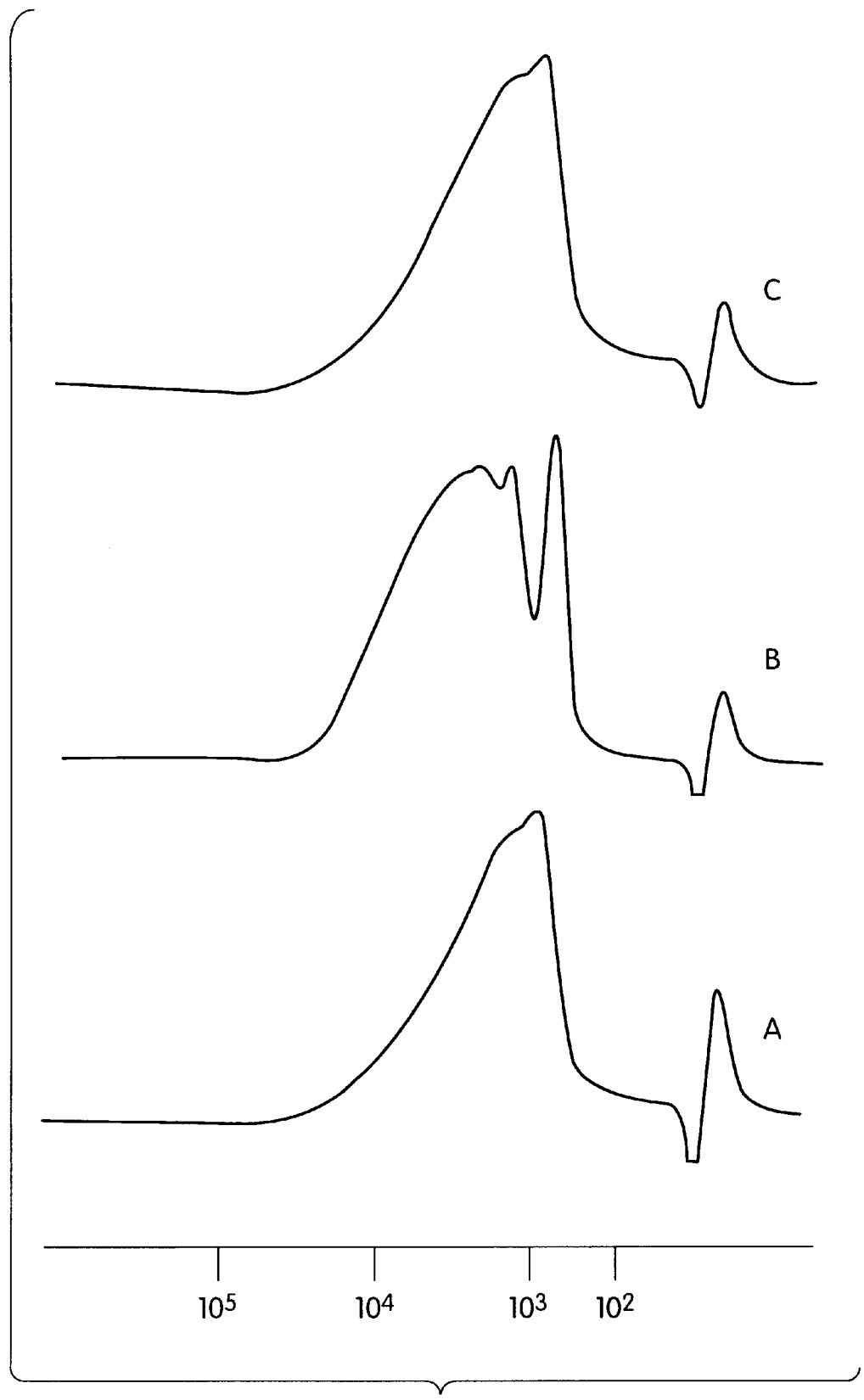
FIG. 7 shows GPC spectra of polymethylsilanes according to the present invention.
Figure 8:
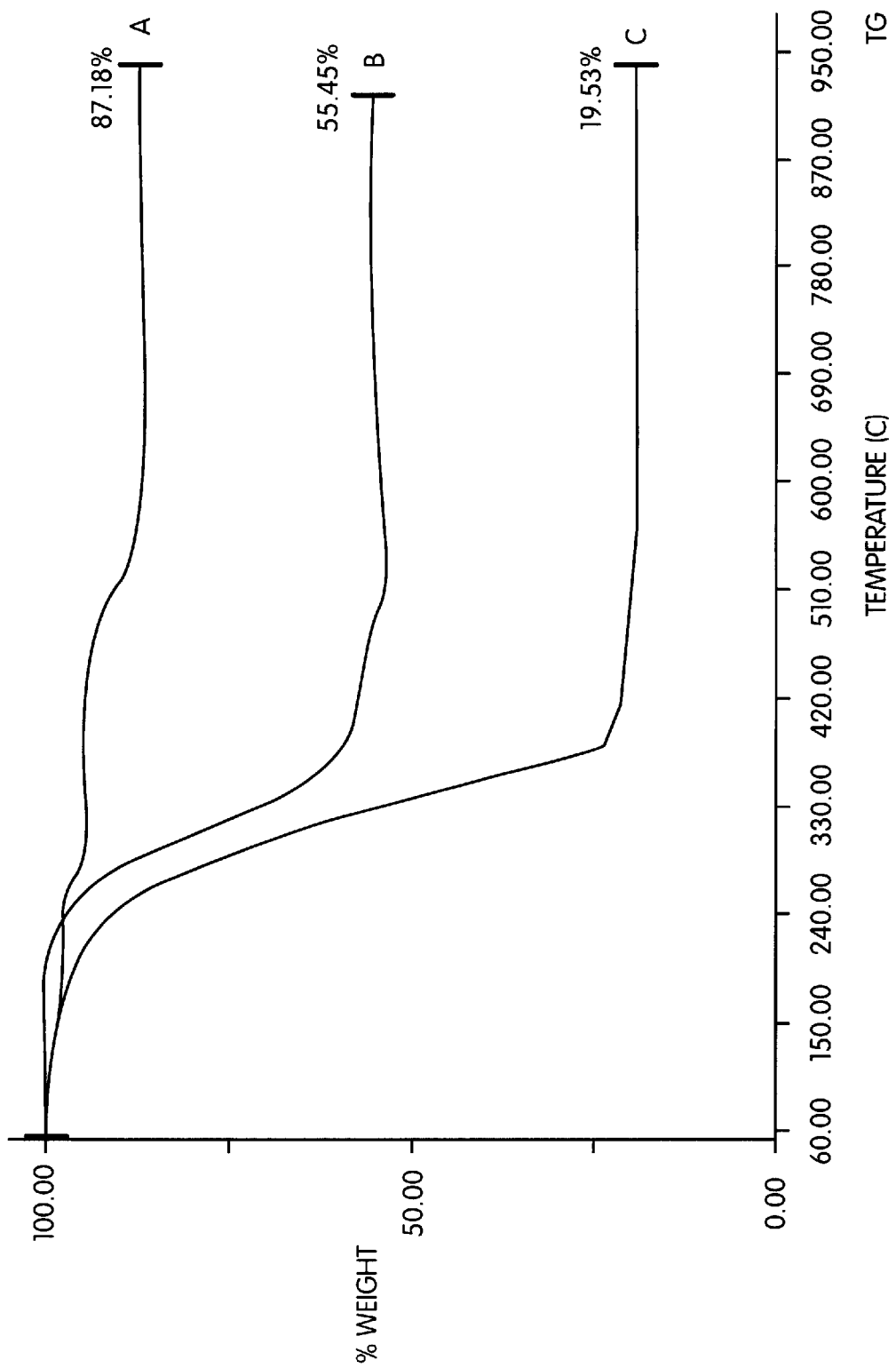
FIG. 8 shows TGA traces of polymethylsilanes according to the present invention.

In addition, the heating program for pyrolysis of poly (methylsilane) is an important factor in achieving stoichiometric SiC. Special attention should be paid to the temperature range at which a transition from polysilane to polycarbosilane takes place. The heat treatment of PMS-3 polymer in an open tube furnace in the argon showed that a Kumada rearrangement (Shiina, K.,; Kumada, M. *J. Org. Chem.* (1958) 139) takes place between 200 and 300° C. as confirmed in the IR spectrum (fingerprint region) by the appearance of the $CH_2$ deformation band at 1349 $cm^{-1}$. This observation is in close agreement with recent results of Harrod, Butler, and co-workers who reported, based on IR spectra, a Kumada rearrangement of a poly(methylsilane) film cast on a silicon wafer at about 200° C. (Scarlete, M.; Brienne, S.; Butler, I. S.; Harrod, J. F. *Chem. Mater.* (1994) 6, 977). Therefore, when during the pyrolysis of poly (methylsilane) a 2 h hold is incorporated into the pyrolysis program at about 300° C., on the way to 1000° C. and higher, the final SiC is almost free of elemental silicon based on the XRD patterns (FIG. 6).

Figure 9A:
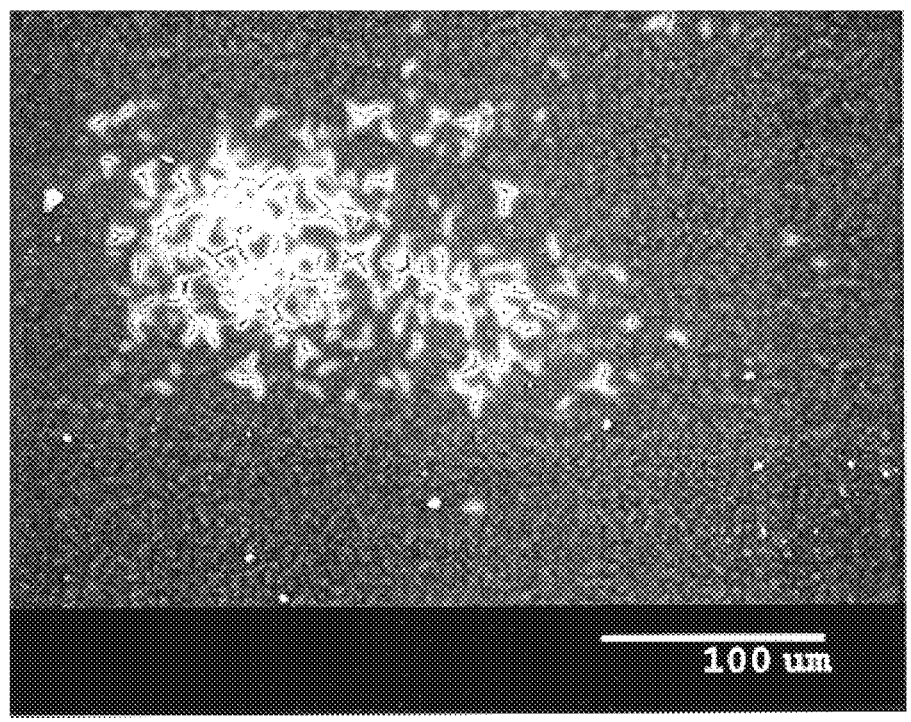
FIGS. 9a and 9b show photocopies of SEM micrographs of ceramic materials according to the present invention.
Figure 9B:
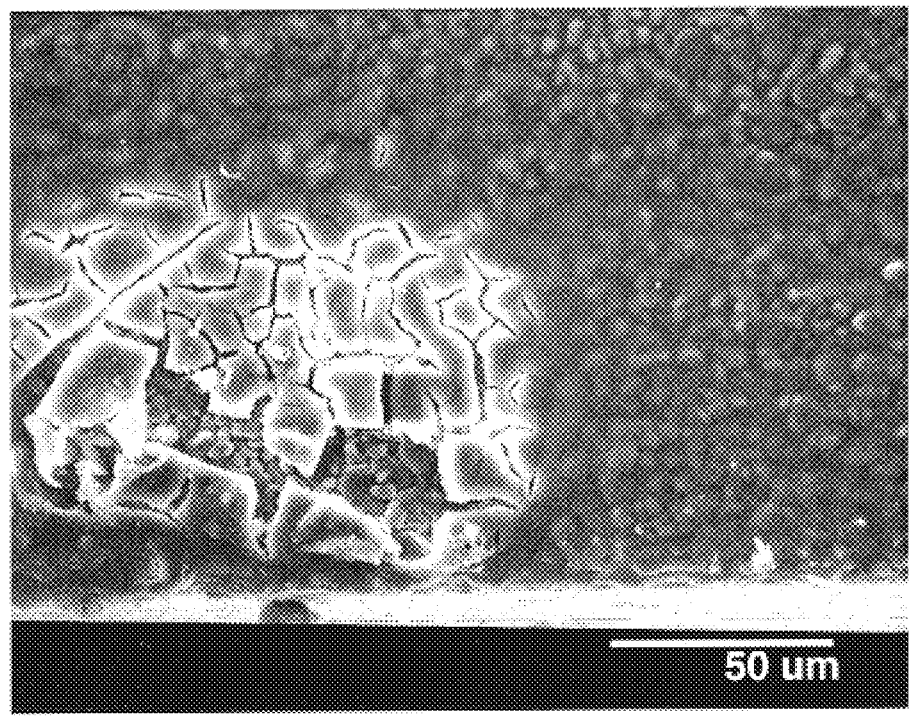
Figure 10A:
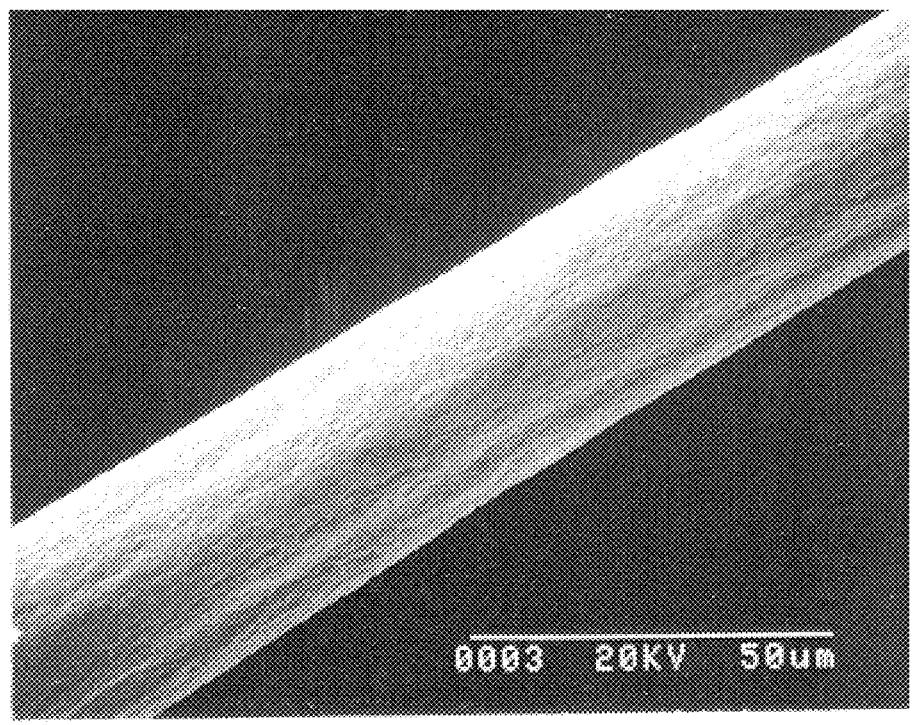
FIGS. 10a and 10b show photocopies of SEM micrographs of ceramic materials according to the present invention.
Figure 10B:
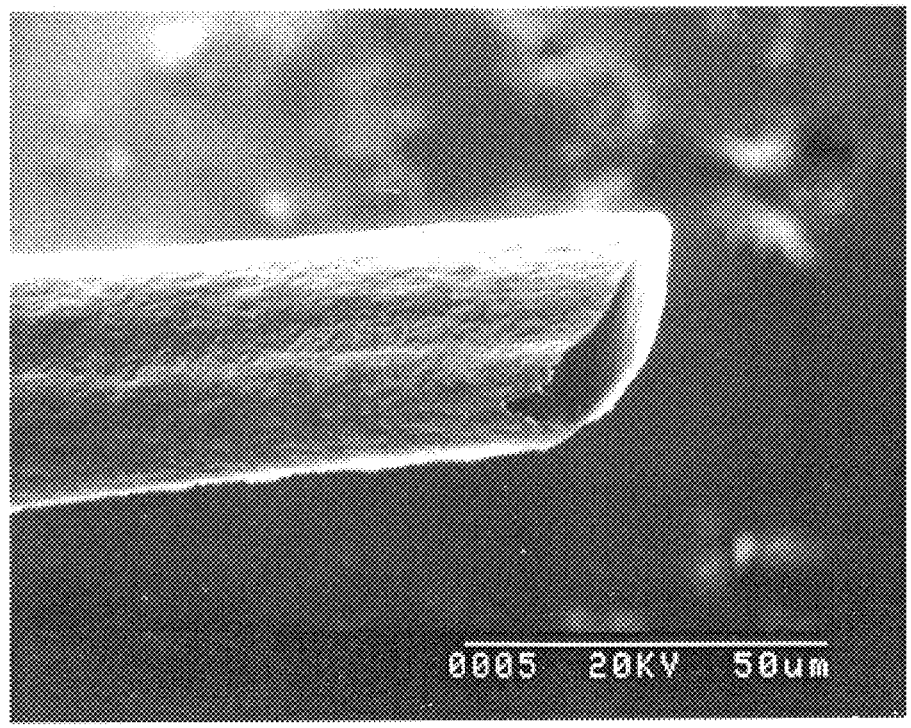

Application of this polymer system as a precursor to ceramic fibers and films also has been explored. Thin polymer films of the PMS-3H have been cast on an alumina substrate by dip coating and pyrolyzed at 1000° C. in Ar, affording a partly crystalline SiC film. The film appears to be mostly uniform with the exception of a few flaws as depicted in FIG. 9. Recently, Harrod's poly(methylsilane) derived from dehydrogenative coupling of $MeSiH_3$ with $Cp_2TiMe_2$ was spun into fibers. Addition of a curing agent was necessary to prevent the fiber from melting during the pyrolysis (Zhang, Z.-F.; Scotto, C. S.; Laine, R. M. *Mat. Res. Soc. Symp. Proc.* (1994) 327, 207). In the present study, fibers were formed by manually pulling them from a viscous toluene solution of PMS-3H and subsequently were pyrolyzed at 1000° C. in Ar (FIG. 10). The resulting ceramic fibers were homogenous and solid inside. The fibers did not require prior curing by irradiation or exposure to oxygen before their pyrolysis since PMS-3 does not show a melting behavior. Monolithic pellets also were prepared from the PMS-3T fraction. The monoliths were observed to shrink 70% by volume without a sign of melting after being pyrolyzed in Ar at 1500° C. for 3 hours. The density changed from 1.03 g/cc (green body) to 2.27 g/cc (71% of the theoretical of density!) for the final monolith. The Vickers microhardness of the monolith was about 2400 HV which is comparable with the hardness of commercially available SiC (Brady, G. S.; Clauser, H. R. Eds. *Materials Handbook*, McGraw-Hill, Inc. (1991) p. 742).

In order further to illustrate the present invention, the following examples are provided. The particular compounds, processes and conditions utilized are meant to be illustrative of the present invention and are not limited thereto.

EXAMPLES

For all the experiments glassware was oven or heat gun-dried under vacuum or under a stream of nitrogen or argon prior to use. Tetrahydrofuran (THF) and diethyl ether were distilled from sodium/benzophenone. Toluene was distilled from sodium and hexane from $LiAlH_4$. Solvents and liquid reagents were deoxygenated by bubbling nitrogen or argon through them for ca. 30 min to one hour prior to use. Chlorosilanes were obtained from Aldrich, Petrarch Systems, Hüls America, or Silar Inc. and were distilled from magnesium under Ar prior to use. Reagent grade sodium was further purified by melting it in stirred, refluxing xylene, and allowing it to set in one large mass upon cooling.

Ultrasonic activation was accomplished using an internally cooled Branson 3200 ultrasonic cleaner operating at 45–56 kHz, 300 W.

The coating of alumina substrate was done using a modified syringe pump model 341A made by Sage Instrument Division of Orion Research Inc. with a draw rate of 0.01 mm/s.

Gel permeation chromatography (GPC) was performed using a Waters/Millipore 150-C ALC/GPC instrument, equipped with $10^3$ and $10^4$ Å Ultrastyragel and 60 Å μ-Porasil columns. Toluene (HPLC grade) was used as eluent at 1 mL/min flow rate at 25° C. The molecular weights reported are relative to the monodisperse polystyrene standards purchased from Polysciences Inc.

Elemental analyses were performed by the Galbraith Laboratories and Scandinavia Microanalytical Laboratory, Denmark (only C, H, and N). Estimated error ranges for analysis of ceramic samples are ±1.5 for carbon and ±3.0% for silicon.

Thermogravimetric analysis (TGA) data were obtained using a Perkin-Elmer System 4 connected to a Perkin-Elmer TGS-2 Thermal Analyzer. Samples (3–8 mg) were heated, in argon, from 50 –950° C. at a rate of 10° C./min.

For the elemental analysis calculation the polymer formula was simplified from $[(CH_3SiH)_x(CH_3Si)_y(CH_3SiH_2)_z]_n$ to $(CH_3SiH_x)_A(CH_3Si)_B$ where subscripts A and B correspond to (x+z) and y respectively and the subscript x denotes the number of substituted protons (i.e., one or two).

Example 1

This example illustrates an economic synthesis of oligo (methylsilane) by reaction between $MeSiHCl_2$ and 2.5 Na in 7/1 v/v of hexane/THF using ultrasonic activation at 45° C.

A 100 mL Schlenk flask was charged with 14.6 g(0.635 mol) of Na shot (~10 mm in diameter), 7.5 mL of THF, 52.5 mL of hexane, and 26 mL (28.6 g, 0.249 mol) of $MeSiHCl_2$. The flask then was placed in the ultrasonic bath for 19 h. The reaction mixture and three 20 mL hexane washings then were cannulated into a thick walled centrifuge bottle and centrifuged for 1 h. The clear supernatant solution was cannulated into a Schlenk flask and trap-to-trap distilled at reduced pressure leaving 8.2 g (75% yield) of clear oil which was soluble in most common organic solvents. The rest of the solids (Na+NaCl) amounted to 33.0 g.

$^1H$ NMR (300 MHz, $C_6D_6$): δ 0.5 ($W_{1/2}$=90 Hz, 3.3 H, $SiCH_3$), 4.1 ($W_{1/2}$=75 Hz, 1.0 H, SiH, $SiH_2$); CH/SiH=3.3; in general CH/SiH=3.3–3.6.

$^{13}$C NMR (75.5 MHz, C$_6$D$_6$): δ$_c$ −12.2 to −5.1 (W$_{1/2}$=230 Hz, SiCH$_3$).

$^{29}$Si NMR (59.59 MHz, C$_6$D$_6$): δ$_{Si}$ −71, −67 (W$_{1/2}$=300 Hz, SiH); −64, −61 (W$_{1/2}$=300 Hz, SiH$_2$).

IR (thin film on NaCl, cm$^{-1}$):2957(s), 2894(s), 2796(w), 2107(vs), 1918(vw), 1410(s), 1247(vs), 1037(vw), 931(vs), 867(vs), 770(vs), 685(vs), 584(s).

Ceramic Residue Yield (TGA): 18%

Example 2

This example illustrates the extraction of the high molecular weight poly(methylsilane) PMS-1 from NaCl crystals obtained from synthesis of oligo(methylsilane) following the procedure outlined in EXAMPLE 1.

A 100 mL Schlenk flask was charged with 25.9 g (1.13 mol) of mirror clean Na metal (~10 mm in diameter), 90 mL of hexane, 13 mL of THF, and 46.8 mL (51.5 g, 0.45 mol) of MeSiHCl$_2$. The flask was placed in the ultrasonic bath at 48° C. for 16 h. After termination of ultrasonication the solids were filtered and washed three times with 30 mL portions of hexane. The clear filtrate was trap-to-trap distilled yielding 13.9 g(0.32 mol, 71%) of translucent oil, which was soluble in most common organic solvents. The rest of the solids (NaCl and Na) weighed 60.0 g. Out of the 60.0 g of solids 44.0 g of yellow NaCl that contained high molecular weight polymer were placed into a 300 mL round-bottomed flask equipped with a magnetic stir-bar. Subsequently 200 mL of deoxygenated water (Ar was bubbled for 1 h) was cannulated in very slowly to avoid runaway reactions which might be caused by traces of unreacted Na metal. During the water addition the flask contents warmed to about 80° C. The resulting suspension of a fluffy white solid was stirred overnight at room temperature. The solid was filtered and subsequently dried in vacuo. The solid was redissolved in 100 mL of toluene to separate it from any remaining NaCl. After filtration, the filtrate was trap-to-trap distilled, leaving 1.9 g of a white, pyrophoric solid which was soluble in most common organic solvents.

$^1$H NMR (300 MHz, C$_6$D$_6$): δ 0.6 (W$_{1/2}$=90 Hz, 4.6 H, SiCH$_3$), 4.1 (W$_{1/2}$=75 Hz, 1.0 H, SiH, SiH$_2$), CH/SiH =4.6.

IR (thin film, NaCl, cm$^{-1}$):2955(s), 2893(s), 2794(w), 2078(vs), 1913(w), 1408(m), 1248(s), 1035(vw), 931(m), 864(vs), 764(vs), 684(vs), 644(s), 587(m).

Ceramic Residue Yield (TGA) (10° C./min., 600° C., Ar): 77% brown ceramic

Analysis: C:23.71%; Si:63.49%; H:8.27%; Na:0.14%; Σ=95.61% Calc. (MeSiH$_x$)$_{0.65}$(MeSi)$_{0.35}$:C:27.43%;Si:64.15%;H:8.42%

Analysis of Ceramic (1500° C., Ar):C:27.27%;Si:65.43%; Σ=92.70% Calc.(SiC): C:29.95%;Si:70.05%

Example 3

This example illustrates Wurtz coupling reaction of MeSiHCl$_2$ and 2.05 Na in 7/1 v/v toluene/THF by ultrasonic activation and subsequent crosslinking of the oligomer with 0.5 Na (synthesis of PMS-3) following the procedure outlined in EXAMPLE 1.

A 300 mL Schlenk flask equipped with an addition funnel containing 64 mL (0.61 mol) of MeSiHCl$_2$ was charged with 29.0 g (1.26 mol) of shiny Na metal (~10 mm in diameter), 105 mL of toluene and 15 mL of THF. The flask was placed in the ultrasonic bath and the chlorosilane was added dropwise over a period of 1.5 h. The mixture was ultrasonicated at 25° C. for 40 h. After termination of ultrasonication the solids were washed three times with 50 mL portions of toluene and the washings, together with yellow solution, were cannulated into a thick-walled centrifuge bottle and centrigued for 1 h. The yellow supernatant solution was trap-to-trap distilled yielding 17.1 g (0.39 mol, 64%) of yellow oil, soluble in most common organic solvents. The oil (17.0 g) was redissolved in 81 mL of toluene and 12 mL of THF. The solution then was cannulated into 250 mL Schlenk flask containing 4.4 g (0.19 mol) of mirror clean Na. The flask was placed in the ultrasonic bath at 25° C. for 18 h. After termination of ultrasonication, the solids were washed three times with 50 mL portions of toluene and the washings, together with yellow-orange solution, were cannulated into a thick-walled centrifuge bottle and centrifuged for 1 h. The yellow-orange supernatant solution was trap-to-trap distilled yielding 13.2 g (0.30 mol, 77%) of an orange solid, which was pyrophoric (when compressed or in a heap, but not when spread out) and soluble in toluene. Out of the toluene soluble fraction (PMS-3T) about 80% by weight of it was soluble in hexane (PMS-3H). The orange solid, upon exposure to daylight for 1 h became green in color. No melting was observed during pyrolysis.

$^1$H NMR (300 MHz, C$_6$D$_6$): δ 0.45 (W$_{1/2}$=83 Hz, 9.8 H, SiCH$_3$); 4.2 (W$_{1/2}$=68 Hz, 1.0 H, SiH, SiH$_2$), CH/SiH =9.8.

IR (thin film, NaCl, cm$^{-1}$):2953(s), 2889(s), 2790(w), 2060(s), 1407(m), 1243(m), 1032(w), 932(w), 864(vs), 760 (vs), 680(vs), 638(s).

Ceramic Residue Yield (TGA):90%

Analysis: C:28.54%;H:7.98%;Na:1.45% Calc. (MeSiH$_x$)$_{0.31}$(MeSi)$_{0.69}$:C:27.66%;H:7.66%-hexane extracted polymer (PMS-3H) fraction contains only 0.096% Na Analysis of ceramics: (1500° C., Ar):C:27.07%;Si:70.92%;Na:0.055%; Σ=98.04% (1000° C., Ar):C:24.69%;Si:67.51%;Na:0.68%; Σ=92.88% Calc.(SiC): C:29.95%;Si:70.05%

Analysis of ceramics derived (1500° C., Ar) from: toluene extracted fraction (PMS-3T):C:28.30%;Si:63.27%; Σ=91.57% hexane extracted fraction (PMS-3H): C:29.34%;Si:66.04; Σ=95.38% Calc. (SiC): C:29.95%;Si:70.05%

Example 4

This example illustrates the preparation of poly (methylsilane)(PMS-3) by reaction of oligo(methylsilane) with 0.5 Na in 7/1 v/v toluene/THF using ultrasonic activation and subsequent quenching of the polymer with MeI following the procedure outlined in EXAMPLE 1.

A 250 mL Schlenk flask was charged with 14.3 g (0.325 mol) of oligo(methylsilane) (CH/SiH=3.6) clear oil, 3.7 g (0.161 mol) of shiny Na shot, and 10 mL of THF and 75 ml toluene. The flask was placed in the ultrasonic bath at 25° C. for 20 h (after about 1.5 h clear solution became yellow-orange). After termination of ultrasonication, the solids were washed three times with 50 mL portions of toluene and the washings, together with yellow-orange solution, were cannulated into a thick-walled centrifuge for 3 h. The yellow-orange supernatant solution was trap-to-trap distilled yielding 8.5 g (0.19 mol, 60%) of an orange solid, which was oluble in toluene, the rest of the polymer was an insoluble gel.

$^1$H NMR (300 MHz, C$_6$D$_6$): δ 0.45 (W$_{1/2}$=90 Hz, 13 H, SiCH$_3$); 4.2 (W$_{1/2}$=70 Hz, 1.0 H, SiH, SiH$_2$), CH/SiH=13.

IR (thin film, NaCl, cm$^{-1}$):2951(m), 2889(s), 2057(s), 1405(m), 1242(s), 1032(m), 930(w), 866(vs), 760(vs), 681 (vs), 518(w)

Analysis: Na:1.72%

Ceramic Residue Yield (TGA):88%

In another reaction where the same ratio of oligomer to Na was used, after 4.5 h of ultrasonication at 30° C. in a 7/1 v/v hexane/THF yielded 98% of yellow-orange solid product which was soluble in hexane and toluene.

$^1$H NMR (300 MHz, $C_6D_6$):δ 0.5 ($W_{1/2}$=90 Hz, 6.0 H, $SiCH_3$); 4.1 ($W_{1/2}$=105 Hz, 1.0 H, SiH, $SiH_2$), CH/SiH =6.0.

Ceramic Residue Yield (TGA):53%

In another reaction where the same ratio of oligomer to Na was used, after 6.5 h of ultrasonification at 19° C. in a 7/1 v/v toluene/THF yielded 100% of yellow-orange solid product (containing 1.09% Na) which was soluble in hexane, toluene, and benzene.

$^1$H NMR (300 MHz, $C_6D_6$):δ 0.5 ($W_{1/2}$=90 Hz, 6.1 H, $SiCH_3$); 4.1 ($W_{1/2}$=90 Hz, 1.0 H, SiH, $SiH_2$), CH/SiH=6.1.

Ceramic Residue Yield (TGA):83%

In another experiment where the same ratio of oligomer to Na was used, after 17.5 h of ultrasonication at 30° C. in a 7/1 v/v hexane/THF yielded 84% of yellow-orange solid product which was soluble in hexane and toluene. The rest of the product was insoluble fully crosslinked polysilane.

$^1$H NMR (300 MHz, $C_6D_6$): δ 0.6 ($W_{1/2}$=75 Hz, 8.3 H, $SiCH_3$); 4.1 ($W_{1/2}$=90 Hz, 1.0 H, SiH, $SiH_2$), CH/SiH =8.3.

Ceramic Residue Yield (TGA):87%

Quenching of the Living Polymer with MeI

A 100 mL Schlenk flask was charged with 2.35 g (0.053 mol) of poly(methylsilane) (CH/SiH=13) yellow-orange solid and 50 mL toluene. The flask then was charged with 5.0 mL of MeI and the solution was stirred for 0.5 h at room temperature. The solution and the fine dispersion of NaI, together with 320 mL toluene washings were cannulated into a thick-walled centrifuge bottle and centrigued for 1 h. The clear supernatant solution was trap-to-trap distilled yielding 2.30 g (0.052 mol, 99%) of a pyrophoric (when compressed or in a heap, but not when spread out) white solid, which was soluble in toluene. The amount of NaI was less <1 mg. The polymer did not show any reaction with $ViMe_2SiCl$ or any melting behavior upon pyrolysis.

$^1$H NMR (300 MHz, $C_6D_6$): δ 0.45 ($W_{1/2}$=90 Hz, 10 H, $SiCH_3$); 4.2 ($W_{1/2}$=70 Hz, 1.0 H, SiH, $SiH_2$), CH/SiH =10.

IR (thin film, NaCl, $cm^{-1}$):2951(m), 2888(s), 2057(s), 1406(m), 1242(s), 1032(w), 930(w), 867(vs), 760(vs), 682 (vs), 640(s).

Analysis: C:23.61%;H:7.01%;Si:63.55%;Na:1.11%; Σ=95.28%

Calc. $(MeSiH_x)_{0.30}(MeSi)_{0.70}$: C:27.71%;H:7.62%;Si:64.67%

Analysis of ceramics (1000° C., Ar):C:23.67%;H:<0.5%;Si:73.34%; Na:0.45%; Σ=97.46% (1500° C., Ar):C:25.64%;H:<0.5%;Si:72.77%;Na:<0.10%; Σ=98.51% Calc.(SiC):C:29.95%;Si:70.05%

Ceramic Residue Yield (TGA):79%

Example 5

This example illustrates synthesis of PMS-2 through extended reaction time experiment of $MeSiHCl_2$ and 2.5 Na in 7/1 v/v hexane/THF by ultrasonic activation following the procedure outlined in EXAMPLE 1.

A 200 mL Schlenk tube was charged with 14.6 g (0.635 mol) of shiny Na metal (~5 mm in diameter), 52.3 mL of hexane, 7 mL of THF, and 26 mL (28.6 g, 0.249 mol) of $MeSiHCl_2$. As soon as the chlorosilane was added the Na surface turned black. The flask then was placed in the ultrasonic bath operating at 47° C. for 64 h. After termination of ultrasonication the solids were filtered and washed three times with 50 mL portions of toluene. The yellow filtrate was trap-to-trap distilled leaving 4.6 g (0.104 mol, 42%, rest of the product was insoluble) of a light-yellow solid which was pyrophoric and soluble in most common organic solvents.

$^1$H NMR (300 MHz, $C_6D_6$): δ 0.5 ($W_{1/2}$=60 Hz, 9.0 H, $SiCH_3$), 4.2 ($W_{1/2}$=90 Hz, 1.0 H, SiH, $SiH_2$), CH/SiH=9.0.

$^{29}$Si NMR (59.59 MHz, $C_6D_6$): $δ_{Si}$ −64, ($W_{1/2}$ =400 Hz, SiH); −60 (trace peak, $SiH_2$).

Ceramic Residue Yield (TGA):80%

Analysis of ceramics (1500° C., Ar):C:26.22%;Si:68.65%; Σ=94.87% Calc.(SiC): C:29.95%;Si:70.05%

Example 6

This example illustrates synthesis of PMS-2 through extended reaction time experiment of $MeSiHCl_2$ and 2.5 Na in 7/1 v/v toluene/THF by ultrasonic activation following the procedure outlined in EXAMPLE 1.

A 300 mL Schlenk tube was charged with 14.6 g (0.635 mol) of shiny Na metal (~10 mm in diameter), 52.3 mL of hexane, 7 mL of THF, and 26 mL (28.6 g, 0.249 mol) of $MeSiHCl_2$. As soon as the chlorosilane was added the Na surface turned black. The flask was placed in the ultrasonic bath operating at 47° C. for 43 h. After termination of ultrasonication, the solid phase was filtered and washed three times with 50 mL portions of toluene. The yellow-orange filtrate was trap-to-trap distilled yielding 5.6 g(0.127 mol, 51%, rest of the product was insoluble) of yellow-orange solid, which was pyrophoric and soluble in most common organic solvents.

$^1$H NMR (300 MHz, $C_6D_6$): δ 0.5 ($W_{1/2}$=60 Hz, 7.35 H, $SiCH_3$), 4.2 ($W_{1/2}$=120 Hz, 1.0 H, SiH, $SiH_2$), CH/SiH= 7.35.

IR (thin film on NaCl, $cm^{-1}$):2953(s), 2889(s), 2790(w), 2065(s), 1893(vw), 1456(w), 1407(m), 1244(s), 1044(s), 930(m), 868(vs), 765(vs), 684(vs), 584(w), 466(m).

Ceramic Residue Yield (TGA): 85%

Analysis of the Polymer: C:25.24%;H:7.21% Calc. $(MeSiH_x)_{0.41}(MeSi)_{0.59}$:C:27.67%;H:7.86%

Analysis of Ceramics (1500° C., Ar):C:27.39%;Si:66.93%; Σ=94.32% Calc.(SiC): C:29.95%;Si:70.05%

Example 7

This example illustrates coating of an alumina substrate with poly(methylsilane) (PMS-3H).

An alumina substrate was pretreated at 1000° C. in air for 3 h prior to coating to assure all possible phase changes on its surface. The substrate then was suspended on a wire and submerged into 1 M hexane solution of PMS-3H. The substrate was withdrawn using 0.01 mm/s draw rate (using a modified syringe pump). A uniform yellow film was achieved. The coated substrate was pyrolyzed in Ar starting at room temperature and ramping 5° C./min. to 1000° C. and held at that temperate for 3 h. After pyrolysis, a brown film was obtained. The film was mostly uniform based on the SEM analysis and was resistant to the scotch tape test.

Example 8

This example illustrates spinning SiC fibers from high molecular weight poly(methylsilane)(PMS-3H).

A viscous solution of PMS-3H in hexane was prepared in the glove box. A spatula was used to manually pull 2–3 cm fibers. The fibers were directly (not requiring curing step) pyrolyzed in an open tube furnace in Ar at a rate of 10° C./min. to 1000° C. where they were kept for 3 h. After pyrolysis, the black fibers were between 1–2 cm in length.

Example 9

This example illustrates the preparation of monolithic SiC from PMS-3T.

Dry powder of PMS-3T was compressed in a IR Kr press. The yellow-orange pellet ($\rho$=0.96 g/cc) was placed in the furnace which was programmed with heating rate of 10° C./mm. 3 h of dwell at 1000° C. (in argon). After pyrolysis, the pellet ($\rho$=2.27 g/cc) had shrunk 70% by volume but retained its shape without any signs of melting. Vickers microhardness of the monolith was 2400 HV.

Comparative Example 10

This example illustrates Wurtz coupling reaction of MeSiHCl$_2$ and 2.5 Na in refluxing THF. (Wood, T. G. Ph.D. Dissertation, Massachusetts Institute of Technology, 1984, Chapter 4.)

A 250 mL Schlenk flask equipped with a magnetic stir-bar and a reflux condenser was charged with 7.3 g (0.32 mol) of mirror clean Na metal (~10 mm in diameter), 30 mL of THF and 13 mL (0.124 mol) of MeSiHCl$_2$. The reaction mixture was stirred for 16 h at room temperature and was heated at reflux for 48 h. After cooling to room temperature, the solids were washed three times with 20 mL portions of hexane and the washings, together with blue solution were cannulated into a thick-walled centrifuge bottle and centrifuged for 1 h. After centrifuging, the supernatant solution became clear and was trap-to-trap distilled leaving 2.2 g (0.05 mol, 40%) of white solid which was soluble in hexane and toluene.

$^1$H NMR (300 MHz, C$_6$D$_6$): $\delta_H$ 0.6 (W$_{1/2}$=120 Hz, 6.6 H, SiCH$_3$), 4.1 (W$_{1/2}$=90 Hz, 1.0 H, SiH, SiH$_2$); poly(THF) impurity, 1.7, 3.3 (0.015 H, 0.010 H respectively, CH$_2$).

IR (thin film on NaCl, cm$^{-1}$):2954(s), 2890(s), 2790(w), 2100(vs), 1913(w), 1453(w), 1408(s), 1246(s), 1079(m), 930(s), 865(vs), 769(vs), 683(vs), 587(m), 490(w).

Ceramic Residue Yield (TGA): 55%

Analysis: C:26.96%;H:8.32% Calc. (MeSiH$_x$)$_{0.48}$(MeSi)$_{0.52}$:C:28.16%;H:7.47%

Analysis of Ceramics (1000° C., Ar):C:25.21%;Si:64.20%; $\Sigma$=89.41% Calc.(SiC): C:29.95%;Si:70.05%

Example 10A

In another example, PMS was prepared by the process of U.S. Pat. No. 4,537,942 using MeHSiCl$_2$, Na, in THF and stirring at room temperature.

A 300 mL Schlenk flask equipped with a magnetic stir-bar and a reflux condenser was charged with 10.0 g (0.43 mol) of mirror clean Na metal (~10 mm in diameter), 150 mL of THF and 20.8 mL (0.198 mol) of MeSiHCl$_2$. The reaction mixture was stirred for four days at room temperature. The solids were then washed three times with 20 mL portions of hexane and the washings, together with blue solution were cannulated into a thick-walled centrifuge bottle and centrifuged for 1 h. After centrifuging, the supernatant solution became clear and was trap-to-trap distilled leaving 3.2 g (0.072 mol, 37%) of white solid which was soluble in hexane and toluene.

$^1$H NMR (300 MHz, C$_6$D$_6$): $\delta_H$ 0.6 (W$_{1/2}$=150 Hz, 5.7 H, SiCH$_3$), 4.1 (W$_{1/2}$=90 Hz, 1.0 H, SiH, SiH$_2$); poly(THF) impurity, 1.7, 3.3 (0.17 H, 0.18 H respectively, CH$_2$).

Ceramic Residue Yield (TGA):49%

Having thus described certain embodiments of the present invention, various alterations, modifications and improvements will be apparent to those skilled in the art. Such alterations, modifications and improvements are intended to be within the scope of the present invention. Accordingly, the foregoing description is by way of example only and is not intended as limiting. The present invention is limited only as defined by the following claims and the equivalents thereto.

What is claimed is:

1. A method comprising the steps of:
    combining a reducing agent and a polysilane precursor to form a mixture; and
    exposing the mixture to ultrasonic radiation and producing a polysilane having a structure of $[(CH_3SiH)_x(CH_3Si)_y(CH_3SiH_2)_z]_n$, where z is not 0, and wherein the sum of x and z is at most about 0.45.

2. The method according to claim 1, wherein the polysilane precursor is a mixture of silane monomers.

3. The method according to claim 1, wherein the exposing step produces an oligosilane.

4. The method according to claim 3, further comprising the step of crosslinking the oligosilane with a reducing agent metal selected from the group consisting of alkaline metals and alkaline earth metals, and combinations thereof to form a polysilane.

5. The method according to claim 1, wherein the polysilane precursor includes methyldichlorosilane.

6. The method according to claim 1, wherein the exposing step is performed at a temperature of at most about 80° C.

7. The method according to claim 1, wherein at least about 60% of the polysilane precursor is converted to a polysilane.

8. A method comprising:
    reacting a reducing agent and a polysilane precursor to produce a polysilane having a formula $[(CH_3SiH)_x(CH_3Si)_y(CH_3SiH_2)_z]_n$, wherein z is not zero and a sum of x and z is at most about 0.45%.

* * * * *

UNITED STATES PATENT AND TRADEMARK OFFICE
CERTIFICATE OF CORRECTION

PATENT NO. : 6,020,447
DATED : February 1, 2000
INVENTOR(S) : Dietmar Seyferth et al.

It is certified that error appears in the above-identified patent and that said Letters Patent is hereby corrected as shown below:

Column 1, line 7, before the "Background of the Invention" please insert -- This invention was made with government support under Grant Number CHE-9221212 awarded by the National Science Foundation. The government has certain rights in this invention. --

Signed and Sealed this

Thirteenth Day of February, 2001

Attest:

NICHOLAS P. GODICI

Attesting Officer      *Acting Director of the United States Patent and Trademark Office*